Jan. 11, 1927.
J. SHAKESPEARE
1,614,401
VEHICLE BODY CONSTRUCTION
Filed June 4, 1925   2 Sheets-Sheet 1
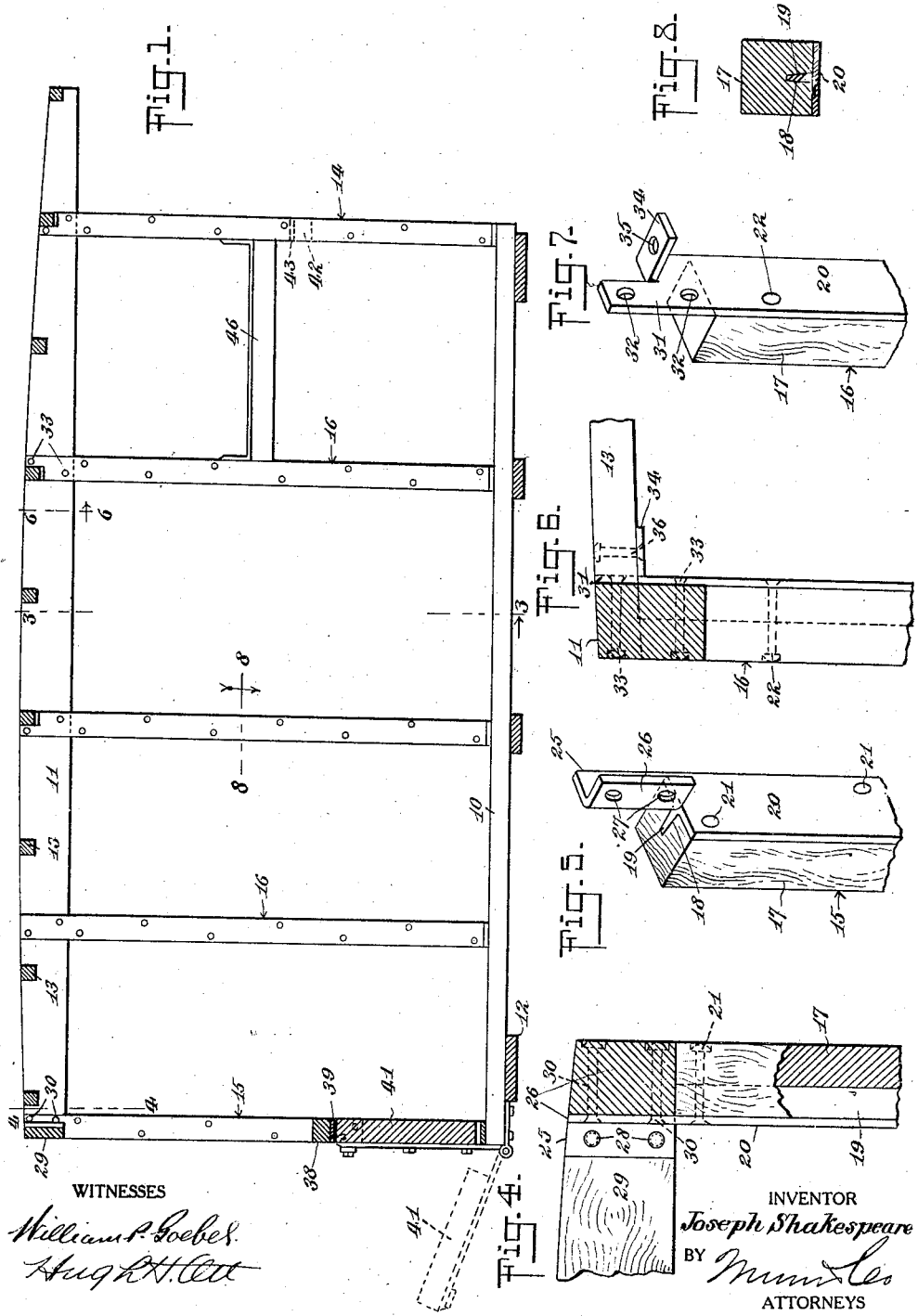
WITNESSES
INVENTOR
Joseph Shakespeare
BY
ATTORNEYS

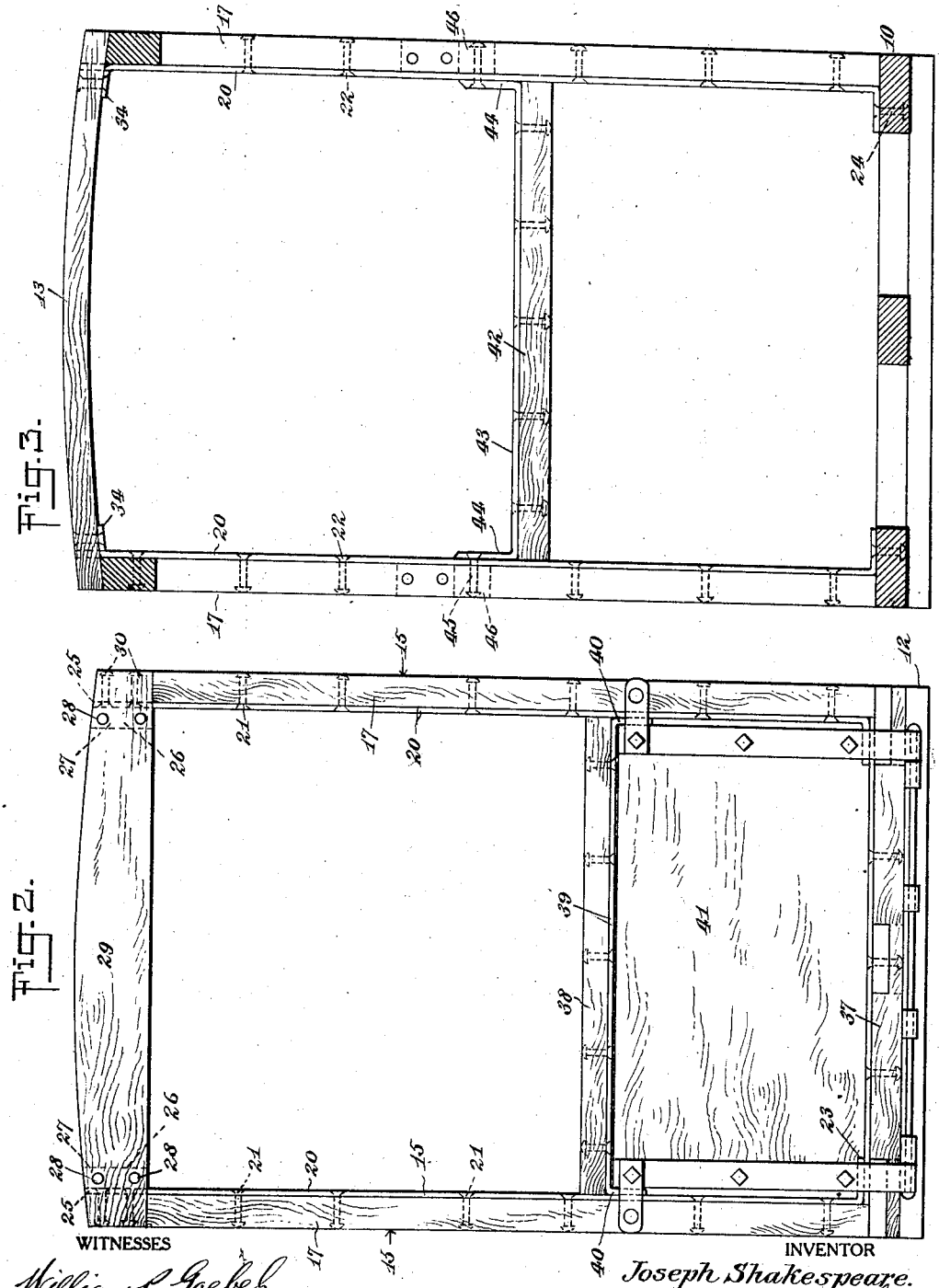

Patented Jan. 11, 1927.

1,614,401

UNITED STATES PATENT OFFICE.

JOSEPH SHAKESPEARE, OF BROOKLYN, NEW YORK.

VEHICLE BODY CONSTRUCTION.

Application filed June 4, 1925. Serial No. 34,916.

This invention relates to vehicle body constructions and has particular reference to an improvement in the body frame structure.

One of the outstanding objects of the present invention is to provide an improved vehicle body frame structure which greatly increases the strength of the same without materially adding to the weight thereof.

The invention furthermore comprehends a fabricated vehicle frame structure which facilitates the removal and replacement of damaged frame elements whereby the time and labor entailed in effecting repairs is reduced to a minimum.

The invention furthermore comprehends a fabricated vehicle body frame structure in which the individual elements thereof are constructed and formed in a manner which eliminates the use of mortise and tenon joints.

As a still further object the invention provides an extremely rigid fabricated vehicle body frame structure which is capable of withstanding the most severe strains and stresses.

The invention furthermore contemplates a fabricated vehicle body frame structure which is comparatively simple in its construction, inexpensive to manufacture and which is highly efficient in its purpose.

With the above recited and other objects in view, reference is had to the following specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a longitudinal sectional view through a fabricated vehicle body frame constructed in accordance with the invention.

Fig. 2 is a rear view thereof.

Fig. 3 is a cross sectional view taken approximately on the line 3—3 of Fig. 1.

Fig. 4 is an enlarged fragmentary transverse sectional view taken approximately on the line 4—4 of Fig. 1.

Fig. 5 is a fragmentary perspective view of the upper end of one of the side upright elements.

Fig. 6 is an enlarged fragmentary cross sectional view taken approximately on the line 6—6 of Fig. 1.

Fig. 7 is a fragmentary perspective view of the upper end of one of the end upright elements.

Fig. 8 is an enlarged cross sectional view through one of the uprights taken approximately on the line 8—8 of Fig. 1.

Referring to the drawings by characters of reference 10 designates the longitudinal bottom rails, 11 the upper longitudinal side rails, 12 the bottom cross bars and 13 the top cross bars or bridges. The top frame elements are supported from the bottom frame elements by the front uprights or pillars 14, the hind uprights or pillars 15 and the intermediate uprights or pillars 16. The said uprights or pillars 14, 15 and 16 each consist of a wooden bar 17 having a longitudinal groove 18 in one of its faces for the reception of the web 19 of a metal T beam 20 which is secured to the grooved face of the wooden bar by rivets 21 the heads of which are disposed flush with the outer surface of the T beam and the riveted heads 22 of which are countersunk in the wooden bar. The bar 17 together with the T beam is preferably squared in cross section. The T beams of the pillars at the lower ends are provided with a lateral or outwardly projecting angular terminal 23 which is apertured to receive therethrough a rivet or rivets 24 for securing the pillars or uprights to the bottom side rails 10. The upper end 25 of the T beam of the hind pillars or uprights 15 extends above the upper end of the wooden bars 17 and the webs 19 are eliminated. The upper extending end of said T beam is provided with a laterally bent portion 25 having apertures 27 therein to accommodate rivets 28 which are anchored in the hind upper cross rail 29. The remaining portion of the upper end 25 of the T beam of the hind pillar or upright is provided with apertures to receive the rivets 30 which are anchored in the upper longitudinal side rails 11 which side rails rest upon and are supported by the upper ends of the wooden bars 17. The front pillar and certain of the intermediate pillars or uprights 14 and 16 are provided with upwardly extending T beam portions 31 which extend within and lie against the inner side of the upper longitudinal side rails 11 and which are provided with rivet receiving openings 32 for the rivets 33 which are anchored in the rails 11. It is of course understood that the webs 19 terminate flush with the upper ends of the wooden bars 17 in this instance and the ends 31 are slitted intermediately and downwardly from their upper extremities so that one of the slitted portions 34 is bent downwardly and inwardly at a right angle to underlie the cross pieces or bridges 13. A rigid opening or openings 35 is provided in the angular portion 34 to receive therethrough the rivets 36 which are anchored in the top cross pieces or bridges 13. It will be observed that the faces of the wooden bars 17 of the uprights or pillars opposite to the T beams are disposed outwardly so that the countersunk riveted heads 22 are disposed below the outer surfaces to permit of the finishing off of the faces of the frame elements and to allow for the application of the body siding, roofing or front and rear cover panels.

In the frame illustrated which represents a conventional milk wagon body the hind pillars or uprights 15 have secured thereto in suitably spaced relation from the bottom rear cross rail 37 an intermediate upper cross rail 38 which is provided on its under face with a T beam liner 39 having downturned right angularly disposed terminals 40 riveted through the hind pillars or uprights to define together with said hind pillars or uprights and the rear bottom cross rail a framed opening for a tail gate 41. It will also be noted that the front pillars or uprights have secured thereto an intermediate front cross rail 42 having an upper T beam facing 43 with up-turned right angular terminals 44 riveted as at 45 to the front pillars and between the front pillars 14 and first intermediate pillars 16 a similar horizontal intermediate rail 46 is provided. It is however to be understood that the invention is not necessarily restricted to milk wagon body construction but is intended to cover in its scope, vehicle body constructions of all types, the gist of the invention residing in the use of body frame rails or elements which are strengthened by T beams, the overlying major portions of which beams are formed with inwardly projecting webs or flanges 19 arranged in a groove in the face to which they are applied and riveted in place to strengthen the structure. The portions of the T beams extending beyond the ends of the rails to which they are applied are cut and bent in the various forms and apertured to receive rivets for securing the frame elements to each other. Such a construction affords convenient means for facilitating the initial fabrication of the body framework and repair of damaged elements without the necessity of disrupting the complete structure to effect repairs or replacements of damaged parts. It is further obvious that by constructing the frame elements as set forth a substantial increase in the strength of the framework is effected without materially increasing the weight while mortise and tenon joints are completely eliminated.

I claim:

1. A fabricated vehicle body frame comprising in combination with a top framework and a bottom framework each including longitudinal and transverse elements secured to each other, a plurality of upright connecting members for the top and bottom framework, each of which consists of a wooden bar having a longitudinal groove in its inner face, a T beam facing element having the web disposed in the groove with the flange overlying the inner face and rivets extending transversely through the flange and the wooden bar with one of the headed ends of each rivet arranged flush with the flange and the other head of each rivet countersunk in the outer face of the wooden bar, the opposite ends of the T beam extending beyond the opposite end of the wooden bar with the web removed.

2. A fabricated vehicle body frame comprising in combination with a top framework and a bottom framework each including longitudinal and transverse elements secured to each other, a plurality of upright connecting members for the top and bottom framework, each of which consists of a wooden bar having a longitudinal groove in its inner face, a T beam facing element having the web disposed in the groove with the flange overlying the inner face and rivets extending transversely through the flange and the wooden bar with one of the headed ends of each rivet arranged flush with the flange and the other head of each rivet countersunk in the outer face of the wooden bar, the opposite ends of the T beam extending beyond the opposite end of the wooden bar with the web removed, the upper extending webless end being slit and bent and having apertures therein to constitute means interfitting with and secured to the elements of the top framework.

3. As a new article of manufacture a pillar or upright for connecting the top framework of a vehicle body with and supporting the same from the bottom framework thereof, in which said pillar or upright consists of a wooden bar having a longitudinal groove in its inner face, a T shaped facing element applied to said inner face with the stem or web arranged within the groove, rivets extending transversely through the flange of said T element and the wooden bar with the opposite heads respectively arranged flush with the T element and countersunk in the outer face of the wooden bar and webless portions of said T beam extending from the opposite ends shaped to conform and interfit with the top and bottom framework and apertured to receive therethrough securing means.

JOSEPH SHAKESPEARE.